United States Patent Office 3,360,022
Patented Dec. 26, 1967

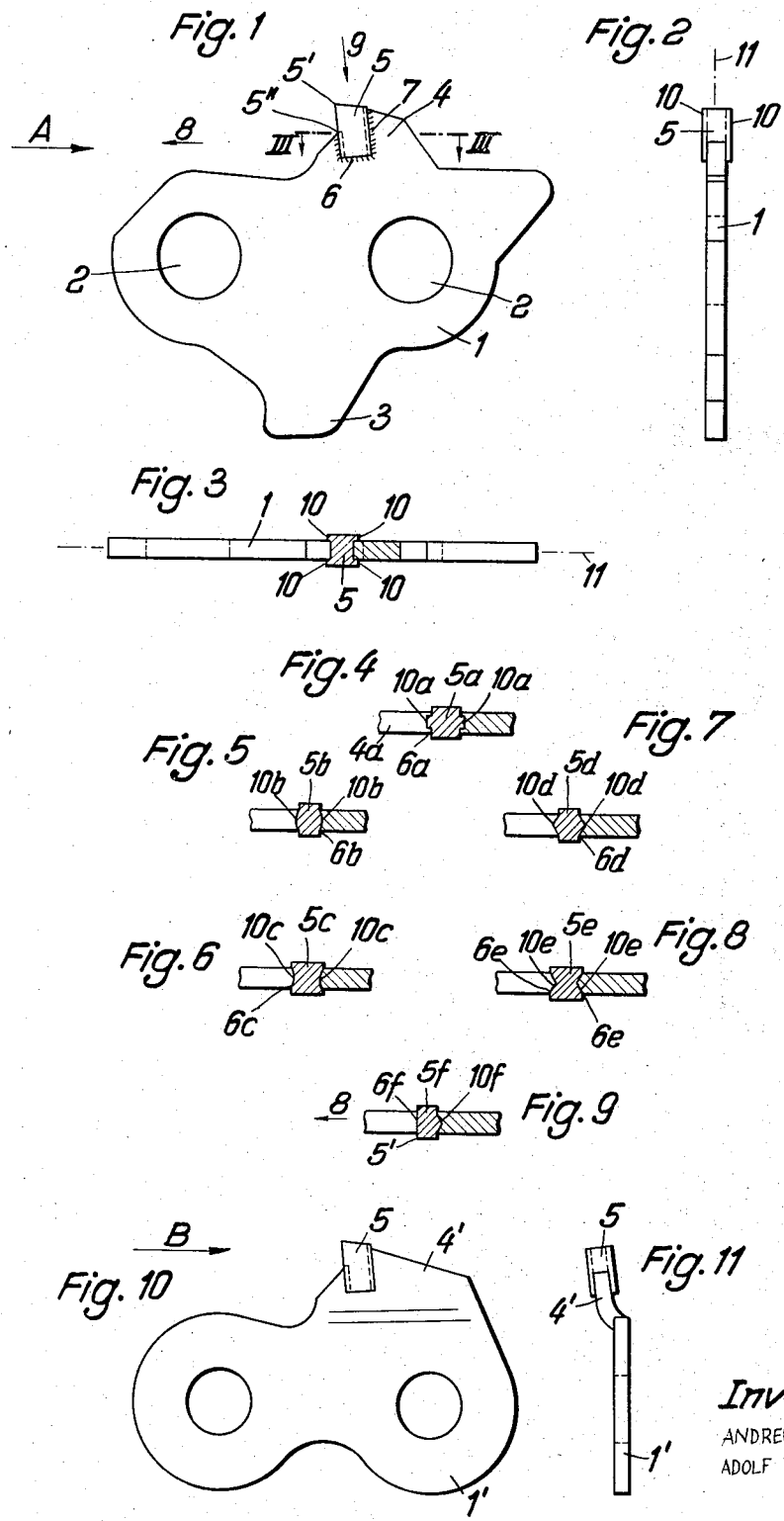

3,360,022
TOOTH LINK FOR MOTOR CHAIN SAWS
Andreas Stihl, Rohrbronn, and Adolf Rätz, Korb, Germany, assignors to Andreas Stihl Maschinenfabrik, Neustadt-Waiblingen, Germany
Filed Dec. 7, 1964, Ser. No. 416,405
Claims priority, application Germany, Dec. 7, 1963, St 21,431
3 Claims. (Cl. 143—135)

The present invention relates to a tooth link for motor chain saws in which the cutting blade is inserted in a groove and soldered to the tooth link.

With heretofore known tooth links for chain saws, the surfaces of said hard metal cutting plates or blades and the wall surfaces of the grooves engaging said plates or blades are smooth, so that the inserted hard metal plates or blades, prior to being soldered to the link, can be displaced laterally. This has the drawback that the proper location of the hard metal plates with regard to the tooth link depends on the skill of the operator inserting the plates so that necessarily larger tolerances are unavoidable. Another important drawback inherent to the heretofore known arrangement outlined above consists in that the lateral surfaces or edges of the hard metal cutting plates will not be located in one and the same plane, so that a less precise and wider cut will result and the plates have to be post-ground more frequently.

It is, therefore, an object of the present invention to provide a tooth link with a hard metal cutting plate or blade, which will overcome the above-mentioned drawbacks.

It is another object of this invention to provide a tooth link with a hard metal cutting plate or blade in such a way that each plate or blade will have a precise desired location when being inserted into the tooth link, so that it will occupy its proper location when being soldered to the link.

These and other objects and advantages of the invention will appear more clearly from the following specification in connection with the accompanying drawing, in which:

FIGURE 1 is a side view of an individual tooth link according to the invention for a chain saw;

FIGURE 2 is an end view of FIGURE 1 as seen in the direction of the arrow A;

FIGURE 3 represents a section along the line III—III of FIGURE 1;

FIGURES 4 to 9 respectively illustrate in section a plurality of different embodiments of the shape of the hard metal cutting plate or blade according to this invention;

FIGURE 10 is a side view of a tooth link somewhat modified over that of FIGURE 1;

FIGURE 11 is an end view of FIGURE 10 as seen in the direction of the arrow B.

The tooth link according to the present invention is characterized primarily in that the hard metal cutting plate or blade is provided with means adapted in cooperation with the tooth link positively to guide said plate or blade when being inserted into the link so as to occupy a certain position relative to said link.

According to one embodiment of the invention, the side walls of the groove receiving the cutting plate are plane, and the corresponding surfaces of the hard metal plate which engage the side wall surfaces of the groove are likewise plane, while the end faces of the hard metal plate are provided with flanks or flanges extending in opposite direction but in longitudinal direction of the tooth link so that said flanks or flanges laterally engage the side surface of the tooth link and guide the hard metal plate thereon. It will thus be appreciated that the cutting plate can be inserted into the groove of the tooth link only in one certain definite manner and in a certain definite position. Thus, if all cutting plates and all tooth links receiving same respectively are of the same design, the cutting plate in each tooth link will occupy the same position relative to the tooth link. After each cutting plate has thus been inserted into its respective tooth link, it is, of course, soldered to the link in customary manner.

According to another embodiment of the present invention, the cutting blade to be inserted into a tooth link and the groove in the tooth link for receiving the cutting blade, instead of having smooth side surfaces, are provided with correspondingly contoured surfaces so as positively to guide the hard metal plate in the groove when the hard metal plate is inserted into the groove. In this way, the cutting blade can likewise be inserted into the groove and located therein only in one certain definite manner.

Referring now to the drawing in detail, and FIGS. 1 to 3 thereof in particular, these figures show a tooth link 1 provided with bores 2 for receiving chain bolts (not shown) to link up link 1 with other links of the chain saw. Tooth link 1 has its lower portion provided with a broaching tooth 3 which is intended to be guided in a groove of a guiding rail (not shown) of the motor chain saw for which the tooth link is to be employed.

Located oppositely to tooth 3 is the cutting tooth generally designated 4 which is formed by a hard metal plate 5 inserted in a groove 6 extending in a direction transverse to the direction of movement of link 1, which direction of movement is indicated by the arrow B.

As will be evident from FIGS. 2 and 3, hard metal plate 5 is provided with flanks or flanges 10 laterally engaging the tooth link 1 from the outside. These flanks 10 will, during the insertion of the metal plate 5, guide the same along the side surfaces of tooth 1 and will thus locate plate 5 in groove 6 in one and only one position. A displacement of the hard metal plate 5 relative to link 1 prior to the soldering of plate 5 to link 1 will be impossible, and consequently, when all links 1 of a saw chain, and the grooves of the links for receiving the same type of hard metal plates will be located in their respective tooth link in the same way, all hard metal plates will be located along one and the same cutting plane 11. In each instance, it is merely necessary to insert the hard metal plate 5 into the respective groove 6 in the direction of the arrow 9, whereupon the hard metal plate is soldered to tooth link 1.

Instead of guiding and locating the cutting plate 5 in the respective groove 6 of tooth link 1 by means of flanks 10, it is also possible, in conformity with the embodiments of FIGS. 3 to 9, to omit said flanks and instead to contour the side walls of the grooves and the corresponding side walls of the hard metal plate engaging the side wall surfaces of the groove. Thus, according to the embodiment of FIG. 4, the side walls of hard metal plate 5a are provided with tongues 10a fitting into corresponding grooves in the side walls of the groove 6a receiving hard metal plate 5a.

According to the embodiment of FIG. 5, the side walls of hard metal plate 5b are convex, and the side wall surfaces of groove 6b guidingly engaging the surfaces 10b of plate 5b are corresponding concave.

According to the embodiment of FIG. 6, the side wall surfaces 10c of hard metal plate 5c are convex, and the side wall surfaces of groove 6c for engaging and guiding surfaces 10c are correspondingly concave.

The embodiment of FIG. 7 differs from that of FIG. 5 in that the side wall surfaces of plate 5d have a convex flat V-shape while the side wall surfaces of groove 6d are shaped accordingly, i.e. have a concave flat V-shape.

The arrangement of FIG. 8 is the reverse of FIG. 7 inasmuch as the side wall surfaces 10e of plate 5e are concave V-shaped and the corresponding side surfaces of groove 6e are corresponding convex V-shaped.

The embodiment of FIG. 9 differs from that of FIG. 7 in that the left-hand wall surface (with regard to the drawing) 6f of plate 5f, and the corresponding side wall surface of groove 5f, are plane.

The plane surface 6f is advantageously located at the front side of the hard metal plate when looking in the direction of movement 8 of link 1 during its operation, so that the front side of the hard metal plate will be plane. If desired, it is, of course, also possible to modify the arrangement of FIGS. 4 to 8 by having one side wall surface of the hard metal plate and the corresponding side wall surface of the groove receiving same, designed plane, similar to FIG. 9. It is, of course, also possible to obtain a plane front side of hard metal plate 5 when the front side of tooth 4 of link 1 is made lower than the rear side, for instance, stops at the edge 5', and that portion of the hard metal plate which extends upwardly from edge 5" is made plane. In this way, with regard to FIG. 1, the cutting edge 5' will be free.

Referring now to the embodiment of FIGS. 10 and 11, these figures represent a tooth link similar to that of FIG. 1 with the primary difference that tooth 4' is somewhat offset with regard to the major plane of link 1'. The guiding and connection of hard metal plate 5, however, may be precisely the same as that described in connection with FIGS. 1 to 9.

It is, of course, to be understood, that the present invention is, by no means, limited to the particular structures shown in the drawings, but also comprises any modifications within the scope of the appended claims.

What we claim is:

1. Saw chain apparatus for motor chain saws comprising a plurality of interconnected cutting tooth links, said links having cutting teeth, and said cutting teeth defining flat-sided grooves extending inwardly from edges of the cutting teeth;

a plurality of hardened metal plates positioned in said grooves, said plates having a central portion fitted between opposite flat sides of the grooves, and said plates having flanges laterally extending from the central portions and overlying opposite sufaces of the cutting teeth, the hardened metal plates defining thereby a generally H-shaped cross section;

and a plurality of means interconnecting adjacent cutting tooth links.

2. Saw chain apparatus of claim 1, wherein internal surfaces of opposite flanges of the hardened metal plates and intermediate walls of the central portions of the plates are relatively rectangularly oriented, and wherein the walls of grooves defined in the cutting teeth are perpendicular to planes of the teeth.

3. Saw chain apparatus of claim 1, wherein the hardened metal plates further comprise cutting edge portions integrally positioned above flanges on sides of the plates which are forward with respect to sense of direction of cutting movement of the cutting teeth.

References Cited
UNITED STATES PATENTS

| 73,210 | 1/1868 | Walker | 143—149 |
| 79,185 | 6/1868 | Baker | 143—149 |
| 2,976,900 | 3/1961 | Mills | 143—135 |

FOREIGN PATENTS

| 1,102,721 | 5/1955 | France. |
| 644,662 | 5/1937 | Germany. |

DONALD R. SCHRAN, *Primary Examiner.*